July 25, 1939.   J. DAMON   2,167,038
BAKING MOLD
Filed Dec. 3, 1938

Inventor
James Damon

By Clarence A. O'Brien
and Hyman Berman
Attorneys

Patented July 25, 1939

2,167,038

UNITED STATES PATENT OFFICE 2,167,038

BAKING MOLD

James Damon, Middletown, N. Y.

Application December 3, 1938, Serial No. 243,861

1 Claim. (Cl. 53—6)

My invention relates generally to an adjustable mold for baking cake, pie or tart pastry shells, and the like, which is capable of being adjusted to predetermine the thickness of the shell resulting from the baking, and an important object of my invention is to provide a simple and efficient arrangement of this character.

Other important objects and advantages of my invention will be apparent from a reading of the following description taken in connection with the drawing, wherein for purposes of illustration I have shown a preferred embodiment of my invention.

In the drawing:—

Figure 1:
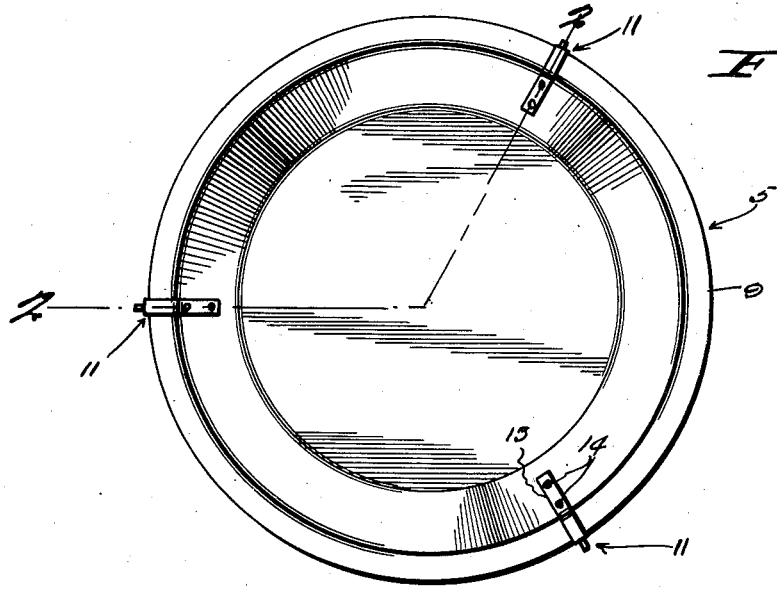
Figure 1 is a top plan view of the embodiment.
Figure 2:
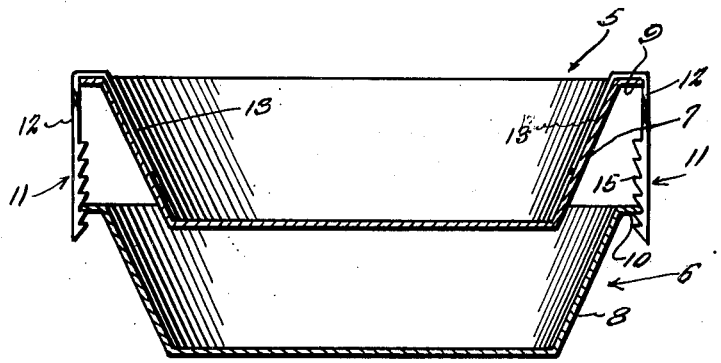
Figure 2 is a general transverse vertical sectional view taken through Figure 1 approximately on the line 2—2.

Referring in detail to the drawing, the numerals 5 and 6 refer generally to substantially similar pan-like forms which are preferably provided with respective acutely angulated walls 7, 8 which have a similar inclination. Both forms have respective lateral flanges 9 and 10. The flange 9 of the upper form 5 has secured to depend therefrom the ratchet toothed spring elements 11 of which there are a suitable number at suitably circumferentially spaced intervals. Each ratchet tooth equipped member 11 has a shank portion 12 which is bent to have a portion lying on the top of the flange 9 and another portion 13 lying along the inner side of the wall 7 and secured thereto by suitable fastening means 14. The various teeth 15 of the elements 11 are at the same level with respect to the different elements so that in adjusting the upper form 5 toward and away from the lower form 6 a proper leveling may be achieved of the upper form with respect to the lower form so as to insure uniformity in thickness of the baked product.

The batter or baking mix is placed in the lower form 6 and the upper form then adjusted relative to the lower form by engaging the selected one of the teeth 15 with the flange 10 of the lower form. This holds the upper form stationary relative to the lower form and as the baking mix rises it will be forced to assume the shape and thickness defined by the space existing between the upper and lower forms.

Although I have shown and described herein a preferred embodiment of my invention, it is to be definitely understood that I do not desire to limit the application of the invention thereto, and any change or changes may be made in the structure and arrangement of the parts, within the spirit of the invention and the scope of the subjoined claim.

Having described the invention, what is claimed as new is:

A baking mold comprising upper and lower pan-like forms, each form having its side walls sloping upwardly and outwardly and terminating in an outwardly extending horizontal flange, a plurality of strips connected with the inner side walls of the upper form passing upwardly and then outwardly over the flange of the upper form and then said strips extending downwardly below the bottom of the upper form, the inner edge of each downwardly extending portion having rack teeth thereon for engaging the outer edge of the flange of the lower form to adjustably hold the upper form on the lower form, said downwardly extending portion of each strip having a certain degree of flexibility to permit the rack portion to be moved into and out of engagement with the flange of the lower form.

JAMES DAMON.